May 12, 1953     W. D. TEAGUE, JR     2,638,107
SUCTION REGULATING VALVE
Filed April 5, 1948
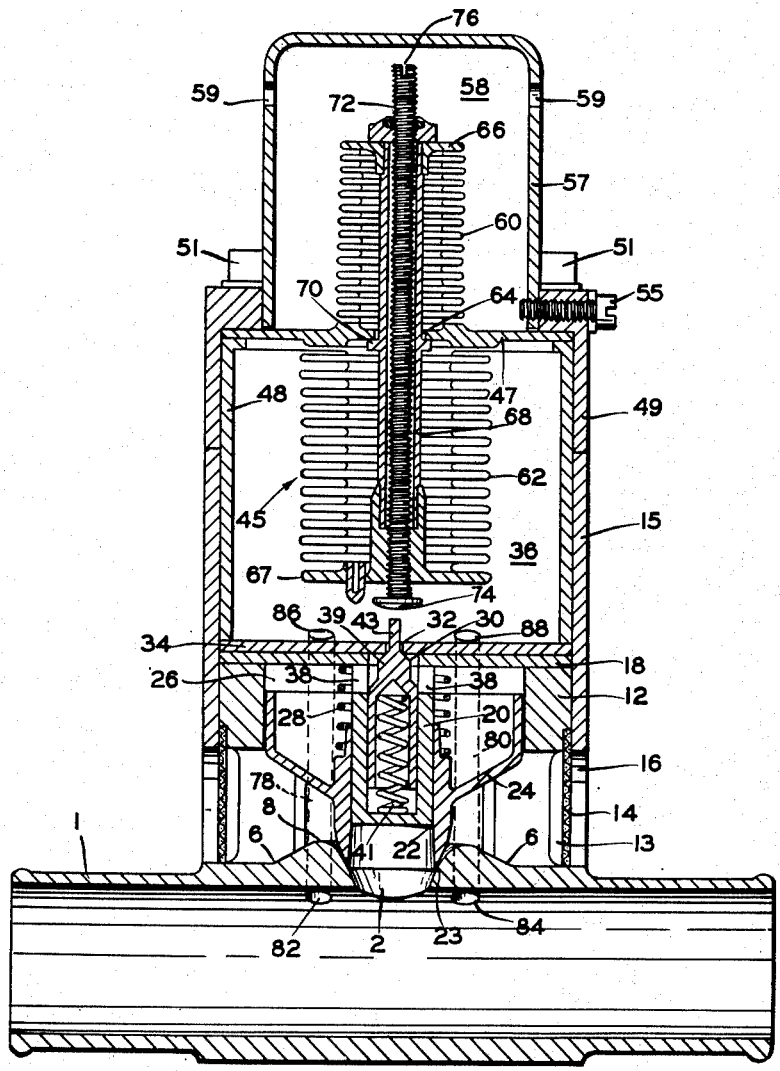
INVENTOR.
*WALTER D. TEAGUE JR.*
BY *Herbert L. Davis, Jr.*
ATTORNEY

Patented May 12, 1953

2,638,107

UNITED STATES PATENT OFFICE 2,638,107

SUCTION REGULATING VALVE

Walter D. Teague, Jr., Alpine, N. J., assignor to Bendix Aviation Corporation, Teterboro, N. J., a corporation of Delaware Application April 5, 1948, Serial No. 19,051

10 Claims. (Cl. 137—81)

The present application relates to an improved suction regulating valve for an aircraft instrument suction line.

It is common practice to provide a suction line for use in the operation of inflatable ice eliminating units on aircraft, as shown for example, in the copending application Serial No. 498,248, filed August 11, 1943, by Donald M. Lawrence, Myron L. Taylor and David Gregg and assigned to Bendix Aviation Corporation, now Patent No. 2,515,519.

Moreover, many aircraft instruments, such as the directional gyro, gyro horizon and turn indicator, are air driven, and it is common to induce atmospheric air into the casing of each of these instruments directed at the conventional buckets carried on the rim of the gyro rotor and to exhaust the air at a definite suction pressure, so that the gyros may be spun with sufficient speed to carry out their different indicating or control functions. Suction is usually applied to the exhaust of the instrument casing by means of a vacuum pump, which is usually driven directly from the engine.

It is common practice to provide in such suction lines, a regulating valve to damp out fluctuations in the suction line pressure and to maintain a predetermined differential between the atmospheric pressure and the pressure in the suction line, as shown for example in U. S. Patent No. 2,161,531, granted June 6, 1939, to G. V. Rylsky, and U. S. Patent No. 2,194,749, granted March 26, 1940, to David Gregg, both of which patents have been assigned to Bendix Aviation Corporation.

For most purposes as described above, a constant differential regulator is sufficient control. However, on aircraft designed for high altitude operation a constant differential results in an increasing pressure ratio as altitude increases.

Thus, for example, a regulator may be designed to hold five inches of mercury differential pressure. At sea level, the pressure may be approximately 30 inches of mercury so that the suction pressure would then be 25 inches of mercury. This corresponds to a pressure ratio of 1.2 to 1. However, at an altitude corresponding to a pressure of ten inches of mercury the differential suction pressure may be five inches of mercury corresponding to a pressure ratio of 2 to 1.

The vacuum pumps which supply the suction are generally limited in the compression ratio which they will withstand. With the desired pressure differential aforenoted, this critical compression ratio may be reached before the maximum altitude of the airplane is attained.

An object of the present invention, therefore, is to provide a pressure regulating valve which may be used in the suction line with the conventional differential pressure regulating valve to prevent a predetermined critical pressure ratio from being exceeded and at the same time retain some degree of differential pressure for operation of the aircraft instruments or inflatable ice eliminating elements at the higher altitudes of the aircraft.

Further, an object of the present invention is to provide such suction regulating valve responsive to atmospheric pressure and suction line pressure to maintain at high altitudes the suction line pressure at a predetermined ratio of the prevailing atmospheric pressure and thus more effectively prevent overloading of the vacuum pump.

Another object of the invention is to provide a cylindrical gate valve for controlling the suction line pressure which valve forms a part of an air motor piston operated by difference in atmospheric pressure and controlled suction line pressure.

Another object of the invention is to provide a novel suction line control mechanism having a control piston open at one side to atmospheric pressure, and a controlled valve passage between the other side of the control piston and the suction line pressure, while an atmospheric-suction line pressure responsive bellows controls the valve passage to affect said control piston so as to maintain the suction line pressure at a predetermined ratio of the atmospheric pressure.

Another object of the invention is to provide a novel bellows arrangement for controlling the aforenoted mechanism in which there are provided a pair of different sized bellows affixed at opposite sides to a common supporting plate and in which the opposite movable ends of the bellows are connected together by a tie bolt so that the ends of the same will move together. One of the bellows is responsive to atmospheric pressure and the other is responsive to suction line pressure, while the interior of the bellows is evacuated so that the bellows provide a ratio effect which is dependent upon the ratio of the surface areas of the two bellows.

Another object of the invention is to provide a novel bellows assembly to position a pilot valve to regulate a main valve so as to provide a predetermined pressure ratio between atmospheric pressure and a suction line pressure within the operating range of the main valve.

The above and other objects and features of the invention will appear more fully hereinafter from a consideration of the following description taken in connection with the accompanying drawing, wherein one embodiment of the invention is illustrated by way of example.

The drawing is a sectional view of a suction regulating valve embodying the invention.

Referring to the drawing, there is provided a suction conduit 1 having one end connected through a suitable conduit to the casing of the aforenoted air driven aircraft instruments. The opposite end of the conduit 1 is connected to the input of the suction pump.

Opening into the suction conduit 1 is a nozzle 2 formed a part of the conduit 1. The nozzle 2 includes an annular portion having a flared surface which rises progressively from a circumferential edge 6 to a point 8 and then progressively descends into an annular orifice to form the sink-like nozzle 2.

A casting 12 formed integral with the suction conduit 1 surrounds the nozzle 2 and has suitable openings 13 formed therein to permit the flow of air from the atmosphere to the nozzle 2. The openings 13 are covered by a suitable screen 14. A lower casing portion 15 fits about the casting 12 and has provided therein openings 16 which coincide with openings 13. The casing 15 is suitably fastened to the conduit 1.

Mounted at the upper end of the casting 12 is a plate 18 which fits within the casing 15 and from which projects a member 20. Slidably mounted on the member 20 and longitudinally movable thereon is a cylindrical gate valve 22 having a knife like edge 23 which is adapted to contact the surface of the nozzle 2 at an acute angle so as to control the flow of air into the suction conduit 1.

The diameter of the knife edge 23 is substantially the same as the diameter of member 20, thus balancing valve 22 and eliminating the effect of changing pressure in conduit 1 on the action of the valve.

Affixed to the cylindrical gate valve 22 is a servo piston member 24 formed integral with the cylindrical gate valve 22 and providing a servo motor means for operating the valve 22.

The surface of the underside of the piston 24 is spaced from the surface of the nozzle 2 and inclined so as to cooperate with the surface of the nozzle 2 for the full rated flow of air upon the cylindrical valve 22 opening the nozzle 2. The surface of the underside of the piston 24 is sufficiently spaced from the surface of the nozzle proper for such flow and with the area normal to the air stream progressively decreasing from the outer circumferential edge 6 to the inner annular orifice so as to smoothly accelerate the airflow from the circumferential edge 6 into the suction conduit 1.

The piston 24 is slidably mounted in a chamber 26 formed in the casting 12 and the piston 24 loosely fits therein so as to permit limited leakage of atmospheric pressure into the chamber 26 from the underside of the piston 24. A spring 28 is interposed between the piston member 24 and the plate 18 so as to bias the piston 24 and the cylindrical gate valve 22 in a direction towards the nozzle 2.

It will be seen then that atmospheric pressure acting through openings 13—16 biases the piston 24 in a direction opposing the force of the spring 28. At the opposite side of the piston 24 is the chamber 26 defined by the casting 12, plate 18 and piston 22.

The plate 18 has formed therein a port 30 aligned with a valve port 32 formed in a plate 34 positioned in the casing 15 adjacent the plate 18 and forming a bottom plate for a second chamber 36 immediately above the chamber 26.

The port 32 opens through port 30 into the member 20 and through ports 38 into chamber 26. Slidably mounted in the member 20 is a servo valve 39 which controls the valve port 32 and is biased by a spring 41 in a direction for closing valve port 32. The valve 39 has a projecting part 43 extending into the chamber 36 and arranged for actuation by a bellows mechanism indicated generally by the numeral 45. The foregoing servo mechanism is of the general type disclosed in the copending application Serial No. 524,063, filed February 26, 1944, by Walter D. Teague, Jr. and assigned to Bendix Aviation Corporation.

The chamber 36 is defined by the bottom plate 34, a top plate 47 and a liner 48 positioned within the lower casing 15 and a top casing portion 49. Bolts 51 secure the top casing portion 49 to the lower casing portion 15.

Secured to the upper casing portion 49 by a bolt 55 is an auxiliary casing 57 which forms with the plate 47 a chamber 58. Ports 59 formed in the casing 57 open the chamber 58 to atmospheric pressure.

Mounted on the plate 47 and extending into the chamber 58 is a flexible resilient bellows 60 which provides one pressure responsive element of the bellows mechanism 45. The inherent resilience of bellows 60 in the position shown tends to collapse the bellows 60.

Mounted at the opposite side of the plate 47 and extending into the chamber 36 is a flexible resilient bellows 62 which has a greater surface area than the bellows 60 and which in the position shown has an inherent resilience tending to extend the bellows 62.

The interior of the bellows 60 opens into the interior of the bellows 62 through an opening 64 formed in the plate 47. The interior of the bellows 60 and 62 is evacuated.

The bellows 60 has a movable end 66 which is connected to a movable end 67 of the bellows 62 through a rigid hollow rod 68 that passes through the opening 64. A stop 70 provided on the rod 68 is arranged to engage plate 47 to limit the collapsing of bellows 62 under the fluid pressure acting on the surface area of bellows 62.

Screw threadedly engaged in the hollow rod 68 is a second rod 72 having a lower end portion or member 74 to contact the projecting part 43 of valve 39 and thereby regulate the valve port 32. There is provided in the upper end of rod 72 a cleft portion 76 to facilitate the adjustment or calibration of rod 72 relative to the projecting part 43 of valve 39.

The position of rod 72 is adjustable so that it may be so calibrated that member 74 will open valve 39 to the correct degree when the predetermined pressure ratio is reached.

The chamber 36 is subjected to the pressure in the suction conduit 1 through passages 78 and 80 formed in casting 12 and casing 15. The passages 78 and 80 open at ports 82 and 84 into conduit 1 and at ports 86 and 88 into the chamber 36.

It will be seen then that in normal operation the bellows 62 having the greater surface area will be subject to the pressure in the suction conduit 1, while opposing the contraction of the bellows 62 is the bellows 60 subject to atmospheric pressure.

Upon the pressure in the suction conduit 1 decreasing so as to exceed a predetermined ratio relative to atmospheric pressure, the atmospheric pressure acting on bellows 60 will tend to collapse bellows 60 and the lower pressure acting on bellows 62 will tend to permit bellows 62 to expand until the member 74 actuates the valve 39 to open valve port 32, whereupon suction applied through port 32 to chamber 26 will cause piston 24 under atmospheric pressure at the lower side to cause the cylindrical gate valve 22 to open nozzle 2 so as to increase the pressure in conduit 1. The increase in the pressure in conduit 1 will then tend to collapse the bellows 62 whereupon the servo valve 39 closes.

Leakage of atmospheric pressure into chamber 26 through the loose fit of piston 24 in chamber 26, together with the biasing force of spring 28 will then tend to move the piston 24 and cylindrical gate valve 22 to a closed position until the foregoing operation is repeated.

It will be seen from the foregoing that there is provided a novel regulator valve including a pair of bellows 60—62 to effect a predetermined ratio between the pressure in the instrument suction line and the prevailing atmospheric pressure. The ratio of the surface areas of the two bellows will determine the ratio to which the valve mechanism will regulate. In the latter mechanism, the bellows assembly 45 positions a servo pilot valve 39 and hence a main regulator valve 22, to maintain the pressure in the suction conduit 1 at a value proportional to and less than the atmospheric pressure at altitudes in excess of that for which the conventional differential pressure control is designed for use.

Thus in the event the altitude of the aircraft is not excessive, the conventional differential pressure regulator valve in the suction line may maintain the predetermined desired differential pressure. However, upon the altitude of the aircraft exceeding a predetermined value whereupon the ratio of the pressure in the suction conduit tends to exceed a predetermined safe ratio for operation of the vacuum pump, then the pressure ratio regulating valve of the present invention will come into operation so as to prevent the pressure in the suction conduit 1 from decreasing below a predetermined pressure or value proportional to that of the atmosphere which value the vacuum pump may maintain without damage, at the higher altitudes.

Although only one embodiment of the invention has been illustrated and described, various changes in the form and relative arrangement of the parts may be made to suit requirements.

What is claimed is:

1. A fluid pressure regulating mechanism, comprising, in combination, a suction conduit, a nozzle formed integral with and opening into the conduit, a housing formed integral with said conduit and surrounding said nozzle, said housing having openings formed therein communicating said nozzle to atmosphere, a cylindrical gate valve for controlling said nozzle, means closing the interior of said cylindrical valve to fluid passage, said nozzle arranged as a valve seat for cooperating with said cylindrical gate valve, a piston formed as a part of said valve and having a surface at one side spaced from the surface of said nozzle and cooperating therewith to provide a passage having a cross-sectional area progressively decreasing from the openings in said housing to the edge of the nozzle so as to smoothly accelerate the air flow from the atmosphere into said suction conduit, and means for controlling the application of pressure from the suction conduit to the other side of said piston for opening and closing said cylindrical gate valve.

2. The combination defined by claim 1 including spring means for biasing said cylindrical gate valve in a direction to close said nozzle against the atmospheric pressure acting at the one side of said piston.

3. The combination defined by claim 1 in which said control means includes a mechanism responsive to atmospheric pressure and the pressure in said suction conduit to control the application of the suction conduit pressure to the other side of the piston.

4. The combination defined by claim 1 including a first chamber subject to atmospheric pressure, a second chamber subject to the suction conduit pressure, a plate dividing one chamber from the other, a first bellows projecting from one side of the plate into the first chamber, a second bellows projecting from the other side of the plate into the second chamber, each of said bellows having a movable end and said second bellows having a greater surface area than said first bellows, a rod passing through said plate and operatively connecting the movable end of one bellows to the movable end of the other bellows, a port to open said second chamber to the other side of said piston, a valve member to open and close said port, and said first and second bellows arranged to regulate said valve member in response to atmospheric and suction conduit pressures to position said cylindrical gate valve so as to effect a predetermined ratio between the atmospheric and suction conduit pressures.

5. A pressure regulator for use in a suction line between a vacuum pump and an aircraft device comprising, in combination, a suction conduit, a cylindrical casing on said conduit, said casing being partitioned into a plurality of chambers, a gate valve in the suction conduit for bleeding air into said conduit, differential bellows means, one of said chambers open to said suction conduit, a piston responsive to atmospheric pressure slidably mounted in an adjacent chamber to actuate said gate valve, a servo-valve protruding into said first-mentioned chamber, said servo-valve actuated by the movement of said bellows to open said first chamber to said adjacent chamber to effect movement of said piston in a direction to open said gate valve to bleed air into said conduit.

6. The combination defined by claim 5 in which said bellows means include a bellows in one chamber responsive to atmospheric pressure, and an inline bellows attached thereto in an adjacent chamber responsive to suction conduit pressure, and a common rod through said first and second mentioned bellows axially actuated by the differential pressure thereof.

7. The combination defined by claim 5 in which said gate valve in the suction conduit for bleeding air into said conduit includes a cylindrical knife-edge gate valve for regulating the flow of air into said suction conduit.

8. A pressure regulator for use in a suction line between a vacuum pump and an aircraft device, comprising, in combination, a suction conduit, a valve in said conduit for bleeding air into said conduit, control means for operating said bleed valve including a servo piston operatively connected to said bleed valve, a servo valve for controlling said servo piston, a first bellows responsive to changes in ambient atmospheric pressure, and a second bellows having a predetermined greater effective area than said first bellows and responsive to the pressure in said suction conduit, said first and second bellows being effective to control said servo valve whereby said servo piston is operated to move said bleed valve to maintain the pressure in said suction conduit at a predetermined ratio proportional to and less than ambient atmospheric pressure.

9. A pressure regulator for use in a suction line between a vacuum pump and an aircraft device, comprising, in combination, a suction conduit, a valve in said conduit for bleeding air into said conduit, control means for operating said bleed valve including a first bellows responsive to changes in ambient atmospheric pressure, a second bellows having a predetermined greater effective area than said first bellows and responsive to the pressure in said suction conduit, said second bellows having a predetermined greater effective area than said first bellows, a servo valve operated by the first and second bellows, a servo piston operated by the pressure differential between ambient atmospheric pressure and the pressure in said suction conduit, said servo piston forming a part of said bleed valve, and said servo valve being operated by said first and second bellows to control the application of the pressure in said suction conduit to said servo piston to thereby vary the position of said bleed valve and maintain the pressure in said suction conduit at a predetermined ratio proportional to and less than ambient atmospheric pressure.

10. The combination defined by claim 9 in which said bleed valve includes a cylindrical knife edge gate valve for regulating the flow of air into said suction conduit.

WALTER D. TEAGUE, JR.

References Cited in the file of this patent

UNITED STATES PATENTS

| Number | Name | Date |
|---|---|---|
| 143,345 | Harrington | Sept. 30, 1873 |
| 312,724 | Jarboe | Feb. 24, 1885 |
| 1,929,198 | Crawford | Oct. 3, 1933 |
| 2,161,531 | Rylsky | June 6, 1939 |
| 2,208,554 | Price | July 16, 1940 |
| 2,400,048 | Jones | May 7, 1946 |
| 2,425,000 | Paget | Aug. 5, 1947 |

FOREIGN PATENTS

| Number | Country | Date |
|---|---|---|
| 335,044 | Great Britain | Sept 18, 1930 |